(12) United States Patent
Lam et al.

(10) Patent No.: US 11,140,108 B1
(45) Date of Patent: Oct. 5, 2021

(54) INTELLIGENT DISTRIBUTION OF MEDIA DATA IN A COMPUTING ENVIRONMENT

(71) Applicant: INTERNATIONAL BUSINESS MACHINES CORPORATION, Armonk, NY (US)

(72) Inventors: Joseph Lam, Markham (CA); Hau Co, Markham (CA); Yichong Zhang, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/929,720

(22) Filed: May 18, 2020

(51) Int. Cl.
*G06F 21/62* (2013.01)
*H04W 12/06* (2021.01)
*H04W 48/18* (2009.01)
*H04W 8/00* (2009.01)
*H04W 88/06* (2009.01)
*H04L 12/58* (2006.01)
*G06N 20/00* (2019.01)
*G06F 40/30* (2020.01)

(52) U.S. Cl.
CPC .......... *H04L 51/14* (2013.01); *G06F 21/6245* (2013.01); *G06F 40/30* (2020.01); *G06N 20/00* (2019.01); *H04L 51/20* (2013.01)

(58) Field of Classification Search
CPC ..... H04L 51/14; H04L 51/20; G06F 21/6245; G06F 40/30; G06N 20/00
See application file for complete search history.

(56) References Cited

U.S. PATENT DOCUMENTS

| | | | |
|---|---|---|---|
| 8,036,598 B1 | 10/2011 | Zhu | |
| 8,189,684 B2 | 5/2012 | Hwang et al. | |
| 2010/0257239 A1 | 10/2010 | Roberts | |
| 2012/0077433 A1* | 3/2012 | Walker | H04L 69/18 455/41.1 |
| 2015/0020209 A1* | 1/2015 | Bennah | G06F 21/62 726/27 |
| 2018/0152840 A1* | 5/2018 | Nagasaki | H04W 12/06 |
| 2018/0232528 A1* | 8/2018 | Williamson | G06F 21/6254 |

FOREIGN PATENT DOCUMENTS

| | | |
|---|---|---|
| CN | 1691054 A | 11/2005 |
| CN | 105959355 A | 9/2016 |
| CN | 107992764 A | 5/2018 |

OTHER PUBLICATIONS

"Inspecting Images for Sensitive Data" Google cloud Last updated May 16, 2020. (16 Pages).
Anonymous: "A Method and Apparatus of Transmiting Sensitive Data Safely"; IPCOM Publication Date: May 13, 2013; (6 Pages).
Mooney; "Peer-To-Peer File Sharing: How to Protect Your Sensitive Data"; (11 Pages).

\* cited by examiner

*Primary Examiner* — Soe Hlaing
(74) *Attorney, Agent, or Firm* — Griffiths & Seaton PLLC

(57) ABSTRACT

Embodiments for intelligent distribution of data in a computing environment by a processor. An appropriateness level of media data based on a plurality of factors for sending the media data from one or more computing devices may be determined. A first communication protocol may be selected for transmitting the media data according to the appropriateness level. The media data may be transferred using the first communication protocol from the one or more computing devices to one or more recipient computing devices within a defined proximity according to the appropriateness level.

14 Claims, 7 Drawing Sheets

INTELLIGENT DISTRIBUTION OF MEDIA DATA IN A COMPUTING ENVIRONMENT

BACKGROUND OF THE INVENTION

Field of the Invention

The present invention relates in general to computing systems, and more particularly, to various embodiments for providing intelligent distribution of filtered data in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

SUMMARY OF THE INVENTION

Various embodiments for intelligent distribution of media data by a processor, are provided. In one embodiment, by way of example only, a method for reducing the footprint of media files during data transfer in a computing environment, again using one or more processors, is provided. An appropriateness level of media data based on a plurality of factors for sending the media data from one or more computing devices may be determined. A first communication protocol may be selected for transmitting the media data according to the appropriateness level. The media data may be transferred using the first communication protocol from the one or more computing devices to one or more recipient computing devices within a defined proximity according to the appropriateness level.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
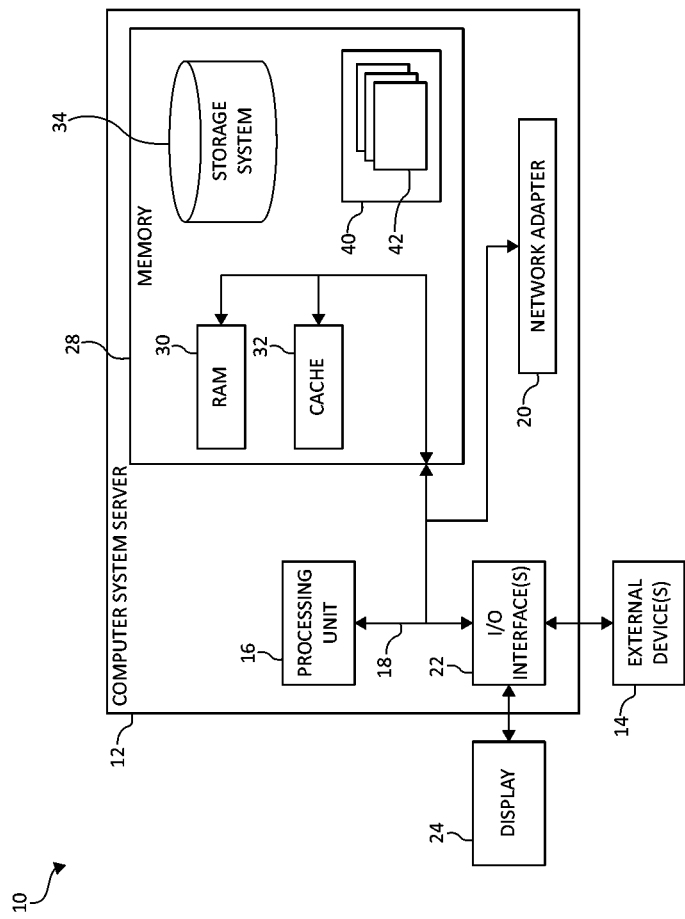
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Moreover, with the advent of immediate, real-time communication made possible by smartphones and other IoT devices, along with the proliferation of various peer-to-peer or data filing sharing applications (e.g., social media applications) and other mechanisms, enable various user to share communication and/or data (e.g., media files). Various types of data and communications, such as media data (e.g., audio data, video data, etc.), emails, messages, speeches, social media posts, and other content may immediately become available in the public domain, and may remain in the public domain potentially indefinitely.

More specifically, media data transfers occurring between a sender and a recipient often time occur through the use of public servers. That is, the media data (e.g., image) transfer takes place with the sender first transmitting the media file to a public server such as, for example, on the Internet or cloud computing system, and then having the recipient download the file from the same server (e.g., Internet or cloud computing system). Thus, direct transfer from the sender to the recipient using a public service introduces a 3rd public party potentially exposing the $3^{rd}$ party to media data that may include private, secured, and/or sensitive data. Such media data may include data that is deemed "proprietary" or contain personal (e.g., personal identifiable information "PII"), sensitive personal Information ("SPI"), classified data, confidential data, protected data, and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. Moreover, depending on a specific region or jurisdiction, some types of data may be considered protected or "classified" while other data may be considered unprotected or "unclassified."

Moreover, users/administrators, entities (e.g., businesses, institutions, organizations, etc.), regions, sovereignties, cultures, agencies, and/or government may also each define their own a set of criteria for classifying data, which may be similar, unique, or different from what others define for classifying data. Thus, user are often unaware of the danger of transmitting various proprietary, classified, sensitive, or secured data (e.g., sensitive images) through a public server and only learn their lessons when a data breach occurs. Thus, regardless of the various types of data that are deemed as sensitive, confidential, classified, protected, private or confidential, such data should be protected from access by unauthorized users (e.g., public servers, $3^{rd}$ parties, etc.). It should be noted that as used herein "sensitive data" may be referencing proprietary, personal, classified, confidential, protected, sensitive, or secured data. That is, "sensitive data" may be referring to singularly and/or collectively proprietary, personal, classified, confidential, protected, sensitive, or secured data (e.g., media data). Thus, any reference to "sensitive" may be used interchangeably with proprietary, personal, classified, confidential, protected, sensitive, or secured.

Thus, a need exists reducing the footprint of various types of sensitive media data (e.g., media data) such as, for example, image files that may include proprietary, personal, classified, confidential, protected, sensitive, or secured data during data transfer. In one aspect, various embodiments of the present invention provide for reducing the footprint of sensitive media files during data transfer in a computing environment. An appropriateness level of media data based on a plurality of factors for sending the media data from one or more computing devices may be determined. A first communication protocol may be selected for transmitting the media data according to the appropriateness level. The media data may be transferred using the first communication protocol from the one or more computing devices to one or more recipient computing devices within a defined proximity according to the appropriateness level. A determination operation may be executed to determine the appropriateness level for the media data is less than, equal to, or greater than a predetermined threshold.

In one aspect, learning the appropriateness level of the media data based on the plurality of factors includes learning a media data relating to approved formats, images, semantics, legal, ethical, moral, cultural, ethnicity, media data, feedback data, training data, historical data during a training cycle using a machine learning operation, and/or proprietary, personal, classified, confidential, protected, sensitive, or secured data.

A determination operation may be executed to determine one or more recipient computing devices exceed a boundary range of the defined proximity. A second communication protocol may be selected for transmitting the media data according to the appropriateness level upon determining the recipient computing device(s) exceed the boundary range of the defined proximity. The media data may be split into multiple media data slices upon determining the one or more recipient computing device(s) that exceed the boundary range of the defined proximity. Each of the media data slices may be sent via the second communication protocol to multiple destinations, each of which may be permanent or temporary destinations for the slices of media data. The one or more recipient computing devices may access and retrieve one or more the media data slices from one or more of the multiple destinations (e.g., multiple permanent or temporary destinations). The recipient computing device(s) may be enabled to combine each of the media data slices into the media data (e.g., the original media data/image).

In an additional aspect, the media data may be transferred using the first communication protocol upon 1) determining the appropriateness level for the media data is equal to or greater than the predetermined threshold and 2) determining the one or more recipient computing devices are within the defined proximity.

Alternatively, the media data may be transferred using a second communication protocol upon 1) determining the appropriateness level for the media data is equal to or greater than the predetermined threshold and 2) determining the one or more recipient computing devices exceed the boundary range of the defined proximity.

A machine learning mechanism may be enabled to interpret legal, ethical, moral, cultural, ethnicity, media data ratings or courteous ones of the plurality of factors (e.g., contextual factors) for determining the appropriateness level for media data, collect feedback data relating to the appropriateness level for media data, train one or more machine learning models to learn, identify, and/or rank the appropriateness level for media data. In an additional aspect, each of the slices of media data may have a different appropriateness level assigned thereto. Thus, depending on the ranked, appropriateness level of the media slices, the media slices may be sent via the first communication protocol, the second communication protocol, or a combination thereof. For example, using the first communication protocol, one or more of the media slices, which have a lower ranked appropriateness level (e.g., non-sensitive or less sensitive data) may be sent via near field communication or Bluetooth® (e.g., directly to the recipients device thereby avoiding third party servers. Additionally, other remaining media slices, which have a higher ranked appropriateness level (e.g., sensitive or highly sensitive data) may be sent via the second communication protocol from the sender to multiple destinations, each of which may be permanent or temporary destinations for the slices of media data, as previously stated.

In an additional aspect, the appropriateness level for media data associated with one or more computing devices may be determined using one or more machine learning models. The media data may be selectively filtered according to the appropriateness level. The filtered media data may be transmitted from the one or more computing devices to one or more recipient computing devices within a defined proximity to the one or more computing devices.

In an additional aspect, a secure local network may be established with a computing device of a sender and a device of a recipient to enable file transfer directly between the sending and the receiving devices (e.g., a first communication protocol). In cases where a local network not available, the present invention may split/divide a media file (e.g., an image) into multiple media file slices/pieces and uploads the media file slices/pieces to multiple destinations (e.g., a plurality of servers via a second communication protocol) to reduce the effect and minimize the exposure of a data breach.

In one aspect, mechanisms of the illustrated embodiments provide for an intelligent system that may read (e.g., passively and/or locally read) media data (e.g., image information) on a device when a user attempts to transmit a file of an image type to a recipient and using a machine learning model 1) learns and identify a appropriateness level for media data (e.g., a degree or level of sensitivity of an image) and 2) selects a type of communication protocol (e.g., a local transfer such as, for example, using near field communication "NFC" or to multiple servers) for transferring the media data according to an assigned appropriateness level to another device. The intelligent system may perform machine learning operations using various AI instances. These AI instances may include IBM® Watson® Visual recognition, and may be trained with different types of proprietary, personal, classified, confidential, protected, sensitive, or secured content (e.g., media files).

The intelligent system may be trained to identify other types of media data (e.g., images) content such as, for example, by identifying sensitive images and the identified sensitive image data may be used to enhance and train additional machine learning models. Furthermore, the intelligent system may perform various modifications to the configuration of sensitive images to desensitize itself from certain content types.

In one aspect, by way of example only, when an incoming media file (e.g., image file) is identified as non-sensitive (e.g., the intelligent system determines no appropriateness level or degree of sensitivity), the intelligent system may ignore the media file and enable the media file to continue being transferred over to $3^{rd}$ party servers/computing systems (e.g., the Internet) and encrypted with standard network layer security. Meanwhile the media file may be stored and fed into the intelligent system to enhance the intelligent system's ability to identify a appropriateness level or "degree of sensitivity" so as to determine if an image is sensitive or non-sensitive. If an incoming media file is determined as "sensitive," there may be multiple scenarios that the intelligent system may employ.

For example, first, the intelligent system may determine that the recipient is within a defined proximity (e.g., within 20 feet through NFC or Bluetooth, or other near-field technology) then the intelligent system may use, open, and/or activate a local network that allows/enables the media file (e.g., image files) to be transferred from the sending device to the recipient device and thereby avoiding use of a public server (e.g., avoiding use of the Internet), which prevents a 3rd public party computing system/server from being introduced to the media file, lowering the chance of exposing the media data in case of a hacking breach.

Second, if the intelligent system determines the recipient exceeds the defined proximity (e.g., greater than 20 feet distance between a sender's device and recipient's device), rather than placing the entire media image (e.g., interpreted as having a defined sensitivity level or defined appropriateness level) into a single point or server, the media image may be split and distributed to multiple remote destinations (e.g., multiple computing systems, multiple servers, and/or multiple cloud computing systems, etc.). The recipient may then retrieve the full/complete image by receiving then combining all parts together. In the event that a data breach occurs, a data attacker may only have access to a portion of the media data.

To further illustrate, consider the following operations using an intelligent system for intelligent distribution of data having a appropriateness level or sensitivity level (e.g., distribution of sensitive image files during data transfer). In one aspect, in response to receiving an image file from a sender for transfer to a recipient, a appropriateness level (e.g., a sensitivity level) associated with image data of the image file may be determined by machine learning model local to the sender. The machine learning model may be trained with a set of images each of which may have a defined or learned appropriateness level (e.g., a sensitivity level) to identify image sensitivity (e.g., identify the filtering or sensitive level of the current image). In one aspect, the machine learning model (that is associated with the sender of the image) identifies that the image sensitivity is less than, equal to, and/or greater than a predetermined threshold (e.g., appropriateness or sensitivity level threshold).

If the appropriateness level (e.g., a sensitivity level) associated with the media data of the media file is less than a predetermined threshold, the image may be determined as non-sensitive. The non-sensitive media data of the media file may be communicated over one or more communication networks such as, for example, the Internet.

If the appropriateness level (e.g., a sensitivity level) associated with the media data of the media file is equal to and/or greater than the predetermined threshold, the media data may be determined as sensitive. The intelligent system may then determine if the recipient is within a defined proximity the sender. If the recipient is within the defined proximity, the sensitive media file may be transferred from the sender to the recipient using a short range transmission protocol such as, for example, NFC and the recipient may view the sensitive image data. Alternatively, if the recipient is not within (e.g., exceeds) the defined proximity, the sensitive media file may be transferred from the sender to the recipient, the sensitive media file may be divided or separated into multiple files or pieces. Each of the multiple pieces of the sensitive media file may be sent, transferred, and/or communicated to a respective one of a number of destinations over one or more communication networks (e.g., Internet, cloud computing systems, etc.). The recipient may then download each of the multiple media file pieces from the number of destinations as different sources and may then combine the multiple pieces into a single media file (e.g., a single image) to view the original sensitive media file. The sensitive media file may be saved and stored as training data for the machine learning model.

With the foregoing in mind, the context of the sensitive data or "determined appropriateness level of data) may be viewed in relation to the context of the data that may trigger negative implications in some scenarios. The so-called "appropriateness" of the media file, such as an image, may be very subjective and context dependent. The same media file may be interpreted and evaluated to be either fine, or "totally improper," or even "illegal" depending on the sender, recipient, and/or contextual information (e.g., location) (e.g., contextual factors). Thus, in determining the "appropriateness level" or "sensitivity level" of media data, the content of the media data may be interpreted.

Accordingly, the so-called "appropriateness" of media data/content settings may be subjective and context dependent. For example, one solution for an appropriate and compliant level of media content settings may be interpreted and evaluated to be either satisfactory or unsatisfactory depending on viewer attributes and/or user profile of each user. Accordingly, the so-called "appropriateness" of particular media data/content may depend greatly upon contextual factors, such as a user profile, age/maturity levels, a type of media data, a health/emotion profile, emotional data, and other contextual factors and even a classification of media content. A deeper, cognitive analysis of the user and levels of the media data may be needed, for example based on standards, rules, policies, and practices in ethical, moral, as well as legal dimensions.

It should be noted that reference to calculating an 'interpreted appropriateness level" against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the media content may be selected, given a weight or other metric value, and compared against a bar metric representative of the threshold.

In one embodiment, for example, media content may be organized into certain appropriateness levels (e.g., sensitivity levels) where a benign form of media content is assigned a lower appropriateness level value, where potentially proprietary, personal, classified, confidential, protected, sensitive, secured, offensive, insensitive or other generally hazardous media content assigned a high appropriateness level value. Here again, the media content may be examined in view of the context in which the media content is to be transferred and/or displayed, so that some media content may be assigned a higher appropriateness level value in a certain context. One of ordinary skill in the art, however, will appreciate that any number of metrics may be implemented as a "threshold" comparison to accomplish the various aspects of the illustrated embodiments.

It should be noted as described herein, the term "intelligent" (or "intelligence") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor based devices or other computing systems that include audio or video devices). Intelligent or "intelligence" may also refer to identifying patterns of behavior, leading to a "learning" of one or more events, operations, or processes. Thus, the intelligent or artificial intelligence "AI" model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term intelligent or "intelligence" may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
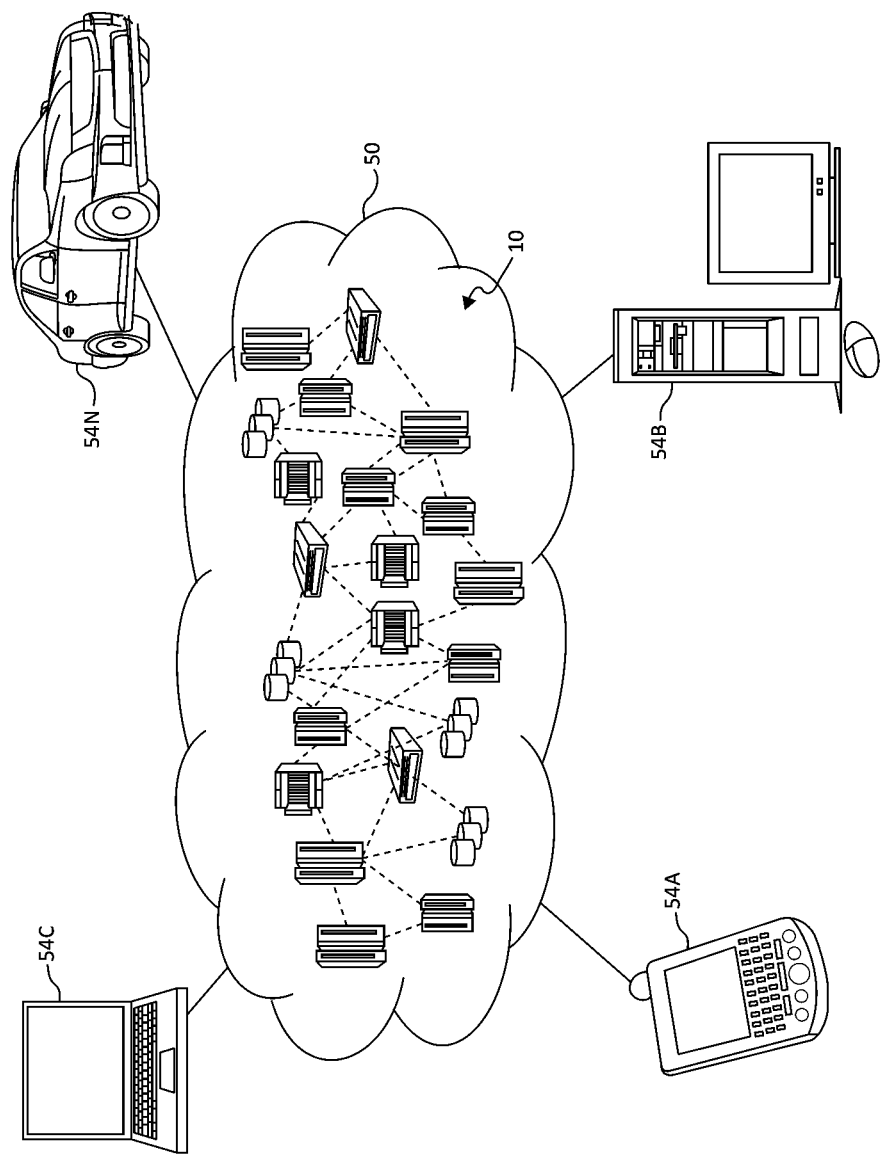
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
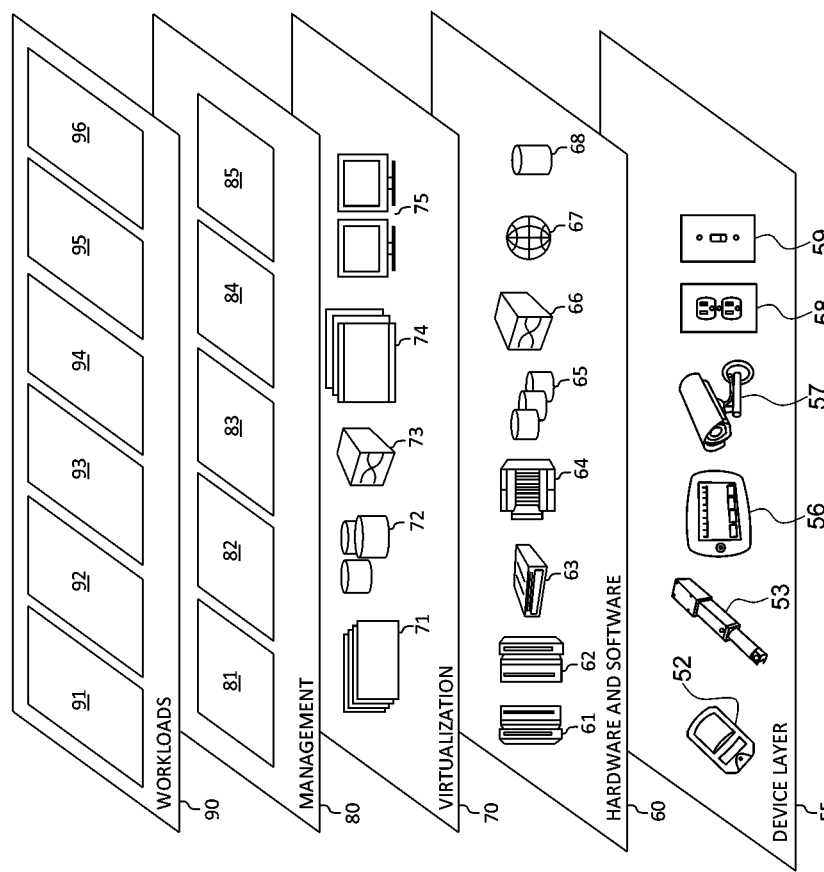
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, in the context of the illustrated embodiments of the present invention, various workloads and functions 96 for providing intelligent distribution of data. In addition, workloads and functions 96 for providing intelligent distribution of data may include such operations as data analysis, machine learning (e.g., artificial intelligence, natural language processing, etc.), user analysis, IoT computing device characteristic parameters, as will be further described. One of ordinary skill in the art will appreciate that the workloads and functions 96 for providing intelligent distribution of data may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
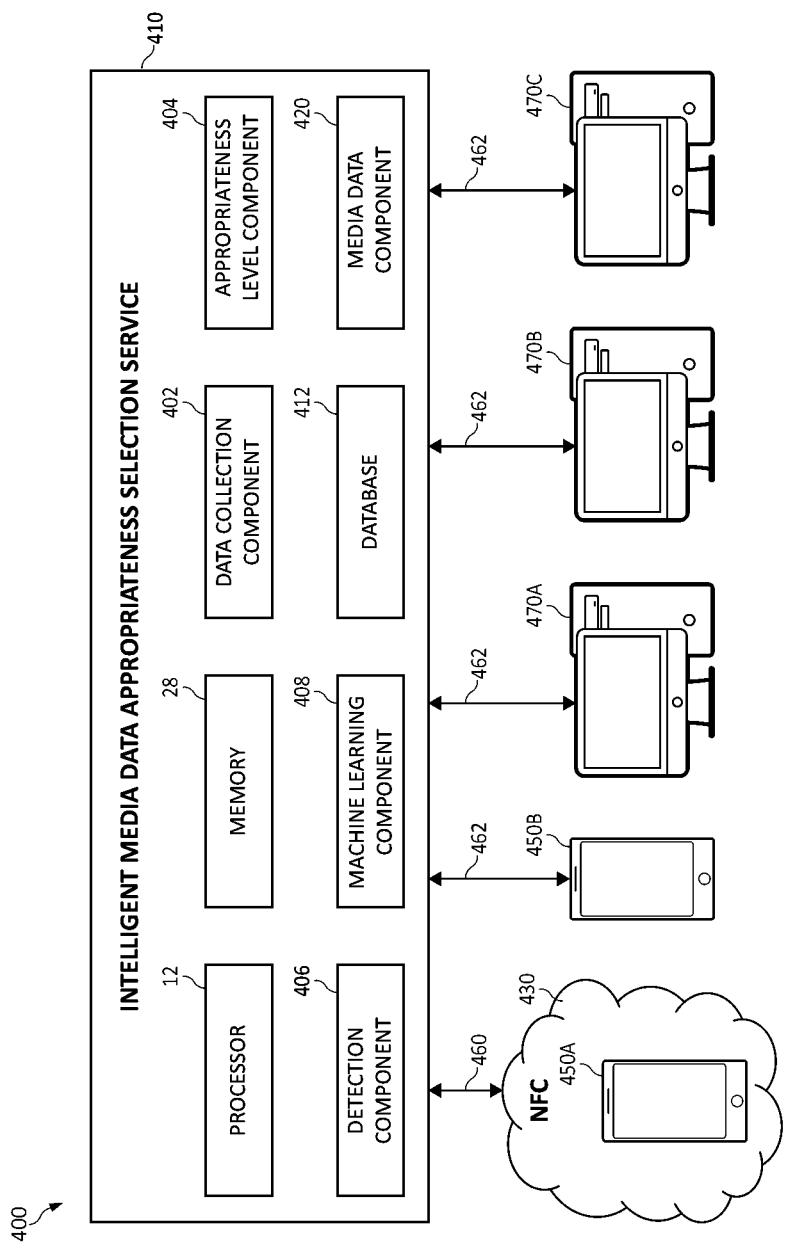
FIG. 4 is an additional block diagram depicting an exemplary functional relationship between various aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as an intelligent media data appropriateness selection service 410, having a data collection component 402, a appropriateness level component 404, a detection component 406, a machine learning component 408, a database 412, and a media data component 420, each of which may work in communication with each other.

Additionally, the intelligent media data appropriateness selection service 410 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The intelligent media data appropriateness selection service 410 may be in communication with via communication networks 460A-B and/or 462 with one or more devices such as, for example, IoT computing devices 450A-B, and/or computing devices 470A-C. In one aspect, the IoT computing devices 450A-B, and/or computing devices 470A-C may be a media display device (e.g., a television, projection screen system, computer, laptop, server, and/or other devices configured to display or providing data such as, for example, audio and/or video data). The IoT computing devices 450A-B may also be one or more various types of communication systems (e.g., speakers, voice-activated hubs, etc.) capable of generating and/or displaying audio and/or video data).

In one aspect, the intelligent media data appropriateness selection service 410 may determine and/or detect a presence and/or a proximity (e.g., the defined proximity 430) of one or more computing devices such as, for example, IoT computing devices 450A-B, and/or computing devices 470A-C to the intelligent media data appropriateness selection service 410.

The IoT computing devices 450A-B, and/or computing devices 470A-C may be devices used by cloud computers, such as, for example, the PDA or cellular telephone 54A, desktop computer 54B, laptop computer 54C, and/or automobile computer system 54N as described in FIG. 2. The IoT computing devices 450A-B, and/or computing devices 470A-C may also be sensor-based devices (e.g., body mounted/implanted sensors and/or a smartwatch).

The IoT computing devices 450A-B, and/or computing devices 470A-C may be used to harvest, collect, and store personal data in the database 412. The machine learning component 408 may continuously and automatically receive feedback, according to the intelligent media data appropriateness selection service 410 (e.g., a media data filtering service) applications for each user, from the IoT computing devices 450A-B, and/or computing devices 470A-C via a communication link 460 and/or communication link 462 (e.g., near field communication "NFC," wired or wireless technology including for example, but not limited to: cellular, WAN, wireless fidelity ("Wi-Fi"), Wi-Max, WLAN, Bluetooth technology, a combination thereof, and/or the like). The intelligent media data appropriateness selection service 410, in association with the detection component 406, may both detect a presence and/or proximity 430 of the IoT computing device 450A-B, and/or computing devices 470A-C.

The intelligent media data appropriateness selection service 410, in association with the data collection component 402, the appropriateness level component 404, the detection component 406, a machine learning component 408, the database 412, and/or the media data component 420, may determine an appropriateness level of media data based on a plurality of factors for sending the media data from one or more computing devices, select a first communication protocol for transmitting the media data according to the appropriateness level, and transmit the media data using the first communication protocol from the one or more computing devices to one or more recipient computing devices within a defined proximity according to the appropriateness level.

The intelligent media data appropriateness selection service 410, in association with the data collection component 402, the appropriateness level component 404, the detection component 406, a machine learning component 408, the database 412, and/or the media data component 420, may determine the one or more recipient computing devices exceed a boundary range of the defined proximity, and/or select a second communication protocol for transmitting the media data according to the appropriateness level upon determining the one or more recipient computing devices exceed the boundary range of the defined proximity.

The appropriateness level component 404, in association with the media data component 420, may split the media data into a plurality of media data slices upon determining the one or more recipient computing devices that exceed the boundary range of the defined proximity, and send the plurality of media data slices via the second communication protocol to a plurality of temporary destinations, wherein the one or more recipient computing devices access and retrieve one or more the plurality of media data slices from each of the plurality of temporary destinations.

The appropriateness level component 404, in association with the media data component 420, may enable the one or more recipient computing devices to combine each of the plurality of media data slices into the media data.

The appropriateness level component 404, in association with the media data component 420, may determine the appropriateness level for the media data is less than, equal to, or greater than a predetermined threshold.

The appropriateness level component 404, in association with the media data component 420, may transmit the media data using the first communication protocol (e.g., using NFC via communication link 460) upon determining the appropriateness level for the media data is equal to or greater than the predetermined threshold and the one or more recipient computing devices (e.g., IoT computing device 450A) is within the defined proximity.

Alternatively, the appropriateness level component 404, in association with the media data component 420, may transmit the media data via a second communication protocol (e.g., using the internet via communication link 462) upon determining the appropriateness level for the media data is equal to or greater than the predetermined threshold and the one or more recipient computing devices (e.g., IoT computing device 450B) exceeds the boundary range of the defined proximity.

The appropriateness level component 404, in association with the media data component 420, may split the media data into a plurality of media data slices upon determining the one or more recipient computing devices (e.g., IoT computing device 450B) that exceed a boundary range of the defined proximity.

The appropriateness level component 404, in association with the media data component 420, may send the plurality of media data slices to a plurality of temporary destinations e.g., the computing devices 470A-C via communication link 462). The one or more recipient computing devices (e.g., the IoT device 450B) may access and retrieve one or more the plurality of media data slices from each of the plurality of temporary destinations (e.g., the computing devices 470A-C via communication link 462). The appropriateness level component 404, in association with the media data component 420, may enable the one or more recipient computing devices (e.g., the IoT device 450B) to combine each of the plurality of media data slices into the media data.

In an additional aspect, the appropriateness level component 404, in association with the media data component 420, may transmit, via communication link 460 to the IoT computing device 450A, the media data using one or more communication protocols upon determining the appropriateness level for the media data is greater than a predetermined threshold and the one or more recipient computing devices (e.g., IoT computing device 450A) are within the defined proximity (e.g., within a defined distanced). In one aspect, the one or more communication protocols includes at least near field communication ("NFC"), which NFC may be the communication link 460.

In an additional aspect, the appropriateness level component 404, in association with the media data component 420, may transmit the media data to the IoT computing devices 450A-B using various types of communication means/protocols (e.g., NFC, internet, intranet protocols via communication links 460 and/or 462) upon determining the appropriateness level for the media data is less than a predetermined threshold.

In an additional aspect, the appropriateness level component 404, in association with the media data component 420, may transmit the media data as a plurality of media data slices to a plurality of temporary or permanent destinations (e.g., the computing devices 470A-C via communication link 462) to enable the one or more recipient computing devices (e.g., IoT computing device 450B) to retrieve and recombine the one or more the plurality of media data slices from each of the plurality of temporary destinations (e.g., the computing devices 470A-C via communication link 462) upon determining the appropriateness level for the media data is greater than the predetermined threshold and the one or more recipient computing devices (e.g., IoT computing device 450B) exceed a boundary range of the defined proximity 430.

The machine learning component 408, in association with the appropriateness level component 404 and/or media data component 420, may interpret legal, ethical, moral, cultural, ethnicity, media data ratings or courteous ones of a plurality of factors (e.g., contextual factors) for determining the appropriateness level for media data. The machine learning component 408, in association with the appropriateness level component 404 and/or media data component 420, may learn one or more corrective actions, appropriateness levels, and/or degrees of filtering for filtering media data, and/or learn the one or more corrective actions, appropriateness levels, and/or degrees of filtering having a greatest amount of effectiveness in displaying at least the portion of the media data according to the appropriateness level.

Additionally, it should be noted that the machine learning component 408, in association with the appropriateness level component 404 and/or media data component 420 may interpret, analyze, and/or process the media data (e.g., interpret an appropriateness level of the media data) according to a plurality of identified factors. Interpreting the appropriateness level of the media data based on the plurality of identified factors may further include interpreting legal, ethical, moral, cultural, ethnicity, media data ratings or courteous ones of the contextual factors in view of the media data.

The machine learning component 408, in association with the appropriateness level component 404 and/or media data component 420, may estimate a appropriateness level of one or more images for both current settings and a predicted adjustment of the features and/or characteristics associated with displayed media content. machine learning component 408, in association with the appropriateness level component 404 and/or media data component 420, may define the assigned/determined appropriateness level on one or more sections of the image as having a potentially negative impact upon a health state, emotional state, or combination thereof of the one or more users or even the abstract user profile. The machine learning component 408, in association with the appropriateness level component 404 and/or media data component 420, may determine the assigned/determined appropriateness level and/also determine, set, and/or define a selected threshold.

For example, appropriateness level determined to be above the selected threshold may trigger the machine learning component 408, in association with the appropriateness level component 404 and/or media data component 420 to initiate one or more transferring actions (e.g., selecting a particular communication protocol) for sending media data.

Also, the machine learning component 408, in association with the appropriateness level component 404 and/or media data component 420, may identify one or more formats, attributes, characteristics, semantics, images, and/or degrees or levels of proprietary data, classified data, protected data, sensitive data, or secured data.

The machine learning component 408 may be initiated to interpret legal, ethical, moral, cultural, ethnicity, media data ratings or courteous ones of a plurality of contextual factors for determining the appropriateness level for media data, collect feedback data relating to the appropriateness level for media data, and/or train one or more machine learning models to learn, identify, and rank the appropriateness level for media data The machine learning component 408 may store all media data, feedback (e.g., data collected from various computing devices such as, for example, IoT computing devices 450A-B, and/or computing devices 470A-C, via the data collection component 402), and/or learned appropriateness levels of various types of media data in database 412. The machine learning component 408 may use one or more machine learning operations such as, for example, an instance of IBM® Watson® such as Watson® Analytics (IBM® and Watson® are trademarks of International Business Machines Corporation).

The machine learning component 408 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
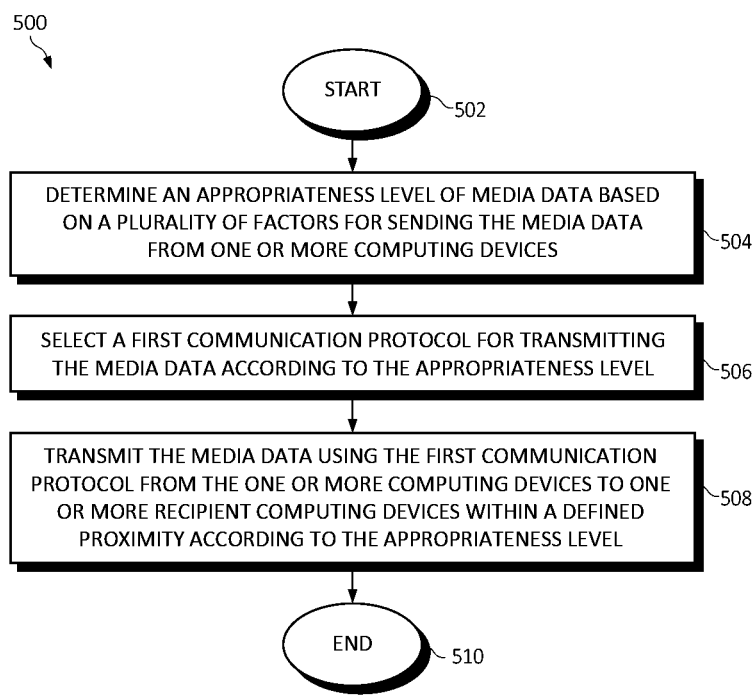
FIG. 5 is a flowchart diagram depicting an exemplary method for providing intelligent distribution of data in computing environment in which aspects of the present invention may be realized.

Turning now to FIG. 5, a method 500 for providing intelligent distribution of filtered data in a computing environment is depicted. The functionality 500 may be implemented as a method executed as instructions on a machine, where the instructions are included on at least one computer readable medium or on a non-transitory machine-readable storage medium. The functionality 500 may start in block 502.

An appropriateness level of media data based on a plurality of factors for sending the media data from one or more computing devices may be determined, as in block 504. A first communication protocol may be selected for transmitting the media data according to the appropriateness level, as in block 506. The media data may be transferred using the first communication protocol from the one or more computing devices to one or more recipient computing devices within a defined proximity according to the appropriateness level, as in block 508. The functionality 500 may end, as in block 510.

Figure 6:
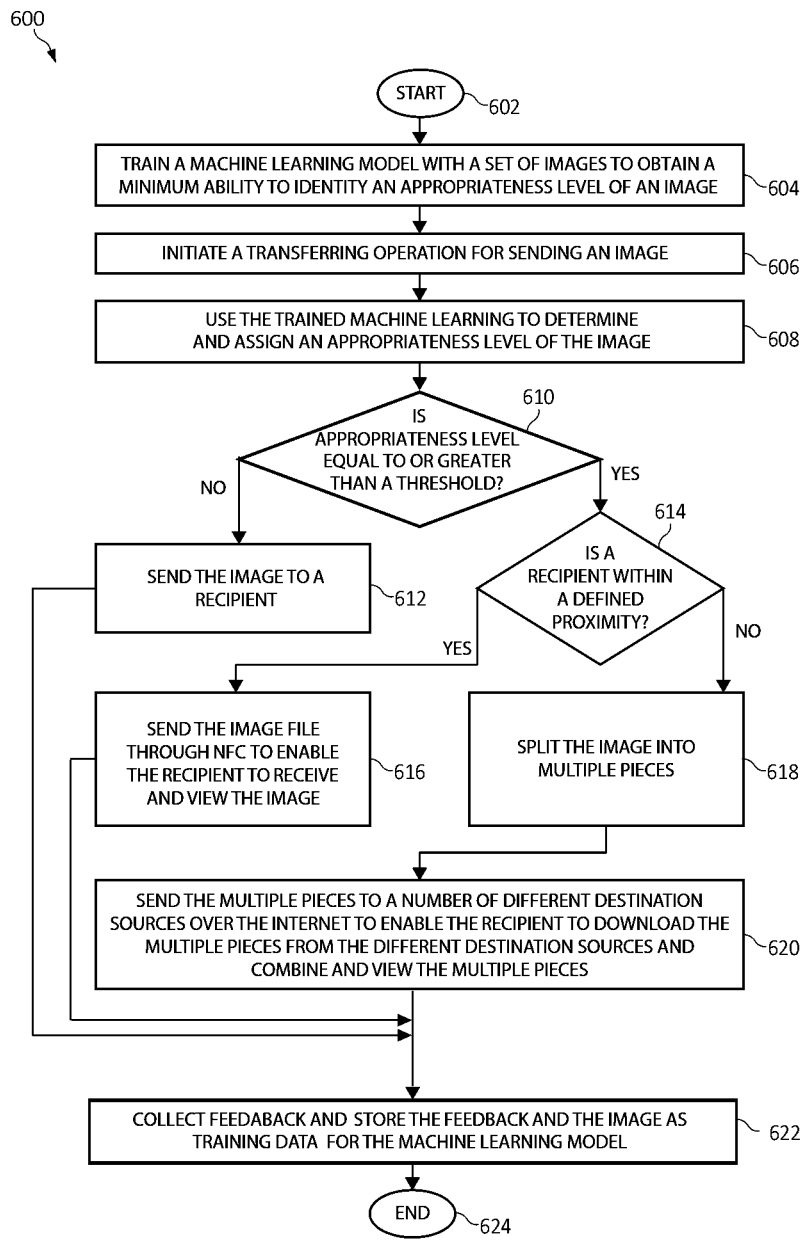
FIG. 6 is an additional flowchart diagram depicting an additional exemplary method for providing intelligent distribution of data in a computing environment in which aspects of the present invention may be realized.

Turning now to FIG. 6, a method 600 for providing intelligent distribution of filtered data in a computing environment is depicted. The functionality 600 may be implemented as a method executed as instructions on a machine, where the instructions are included on at least one computer readable medium or on a non-transitory machine-readable storage medium. The functionality 600 may start in block 602.

A machine learning model may be trained with a set of images to obtain a minimum ability to identity an appropriateness level of an image, as in block 604. A transferring operation may be initiated for sending an image, as in block 606. The trained machine learning may be used to determine and assign an appropriateness level of the image, as in block 608.

A determination operation may be performed to determine if the assigned appropriateness level of the image is equal to or greater than a defined threshold (e.g., is the appropriateness level equal to or greater than a threshold?) as in block 610. For example, the appropriateness level may indicate a lower ranked appropriateness level (e.g., non-sensitive or less sensitive data) or a higher ranked appropriateness level (e.g., sensitive or highly sensitive data). Thus, a lower ranked appropriateness level assigned to an image may be less than the defined threshold while a higher ranked appropriateness level is equal to or greater than the defined threshold.

If no at block 610, the image may be sent (e.g., sent via the internet, NFC, and/or by using another wireless communication means) to a recipient, as in block 612. The functionality 600 may then move to block 622.

If yes at block 610, a determination operation may be performed to determine if a recipient is within a defined proximity (to the sender), as in block 614.

If yes at block 614, the image file may be sent through near field communication ("NFC") to enable the recipient to receive and view the image, as in block 616. The functionality 600 may move from block 616 to block 622.

If no at block 614, the image may be split into multiple pieces, as in block 618 and then the functionality 600 may move to block 620. At block 620, the multiple pieces may be sent to a number of different destination sources over the Internet to enable the recipient to download the multiple pieces from the different destination sources and combine and view the multiple pieces (e.g., combine and view the image as a single image). The functionality 600 may move from block 620 to block 622.

At block 622, feedback data may be collected, and both the collected feedback and the image (including the assigned appropriateness level of the image) may be stored as training data from the machine learning model. For example, a machine learning operation, a user, or a combination thereof may provide, as feedback, an evaluation or rating of each decisions made during the functionality 600 at each block, including providing feedback relating to the determined and assigned appropriateness level along with the image(s) that are sent through NFC or transferred to multiple destination. Feedback may also include evaluations or ratings relating to each of the multiple pieces of images (e.g., quality or quantity) along with the operations relating to transferring the multiple pieces of images to the multiple destinations, along with the recombining the image slices to view as a single image. Additionally, the feedback may indicate that the assigned appropriateness level (e.g., a lower ranked appropriateness level or a higher ranked appropriateness level) was accurately interpreted or inaccurately misinterpreted in relation to a plurality of factors, as described herein. For example, the image may be assigned a lower ranked appropriateness level indicated potentially non-sensitive images but the feedback indicates that the image should have been assigned a higher ranked appropriateness level. In short, the type and quantity of feedback collected may be learned, defined, and/or provided by a machine learning operation and/or a user. The functionality 600 may end, as in block 624.

In one aspect, in conjunction with and/or as part of at least one block of FIGS. 5-6, the operations of methods 500 and/or 600 may include each of the following. The operations of methods 500 and/or 600 may split the media data into a plurality of media data slices upon determining the one or more recipient computing devices that exceed a boundary range of the defined proximity. The operations of methods 500 and/or 600 may send the plurality of media data slices to a plurality of temporary destinations, wherein the one or more recipient computing devices access and retrieve one or more the plurality of media data slices from each of the plurality of temporary destinations. The operations of methods 500 and/or 600 may enable the one or more recipient computing devices to combine each of the plurality of media data slices into the media data.

The operations of methods 500 and/or 600 may restrict the media data from be transmitting upon determining the appropriateness level for the media data is less than a predetermined threshold, and/or transmit the media data upon determining the appropriateness level for the media data is greater than a predetermined threshold.

The operations of methods 500 and/or 600 may transmit the media data using one or more communication protocols upon determining the appropriateness level for the media data is greater than a predetermined threshold and the one or more recipient computing devices are within the defined proximity. The one or more communication protocols (e.g., first communication protocol) includes at least near field communication ("NFC"). The operations of methods 500 and/or 600 may transmit the media data using internet or intranet protocols upon determining the appropriateness level for the media data is less than a predetermined threshold, and/or transmit the media data as a plurality of media data slices to a plurality of temporary destinations to enable the one or more recipient computing devices to retrieve and recombine the one or more plurality of media data slices from each of the plurality of temporary destinations upon determining the appropriateness level for the media data is equal to and/or greater than the predetermined threshold and the one or more recipient computing devices a exceed a boundary range of the defined proximity.

The operations of methods 500 and/or 600 may interpret legal, ethical, moral, cultural, ethnicity, media data ratings or courteous ones of a plurality of contextual factors for determining the appropriateness level for media data, learn one or more corrective actions for filtering media data, and/or learn the one or more corrective actions having a greatest amount of effectiveness in displaying at least the portion of the media data according to the appropriateness level.

The operations of methods 500 and/or 600 may initialize a machine learning mechanism to: 1) collect feedback data from the user (e.g., sender or recipient), 2) learn the one or more corrective actions for filtering media data, and/or 3) learn the one or more corrective actions having a greatest amount of effectiveness in displaying at least the portion of the media data according to the one or more user classifications (e.g., classifications as to what should be filtered based on a degree or level of filtering). Also, the operations of methods 500 and/or 600 may initialize the machine learning mechanism learn one or more corrective actions or degrees of filtering having a greatest amount of effectiveness in minimizing a possible negative impact of the media data upon the user.

Figure 7:
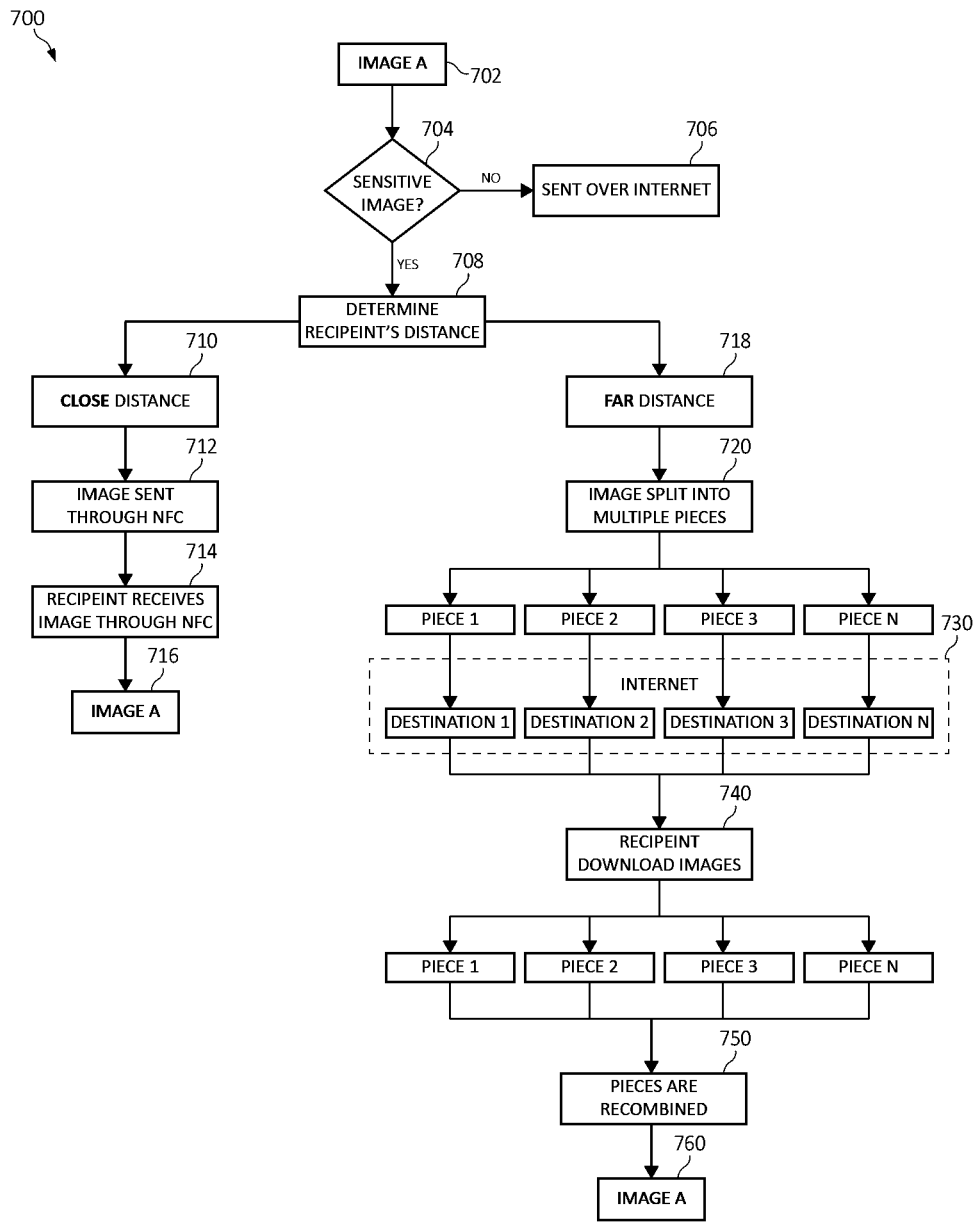
FIG. 7 is an additional flowchart diagram depicting an additional exemplary method for providing intelligent distribution of data in a computing environment in which aspects of the present invention may be realized.

Turning now to FIG. 7, an addition method 700 for providing intelligent distribution of filtered data in a computing environment is depicted. The functionality 700 may be implemented as a method executed as instructions on a machine, where the instructions are included on at least one computer readable medium or on a non-transitory machine-readable storage medium. The functionality 700 may start in block 702.

Starting in block 702, an image (e.g., Image A) may be collected and analyzed and determine if the image is a sensitive image, as in block 704. If no at block 704, the image may be sent over the internet, as in block 706.

If yes at block 704, a determination operation is performed to determine a distance the recipient is to a sender of the image, as in block 708.

If the distance (e.g., a close distance) 710 is within a determine range (e.g., a close distance where NFC or Bluetooth technology may be used), the image may be sent from the sender to the recipient through NFC, as in block 712. The recipient may receive the image through NFC, as in block 714. The image (e.g., image A) may be viewed on a device associated with the recipient, as in block 716.

If the distance (e.g., a close distance) 718 exceeds the determined range (e.g., a far distance where NFC or Bluetooth technology may not be used), the image may be split into multiple pieces such as, for example, piece 1, piece 2, piece 3, and/or piece n, where "n" is a positive integer, as in block 720. The multiple pieces such as, for example, piece 1, piece 2, piece 3, and/or piece n may be sent over the internet and stored a multiple destination such as, for example, destination 1, destination 2, destination 3, and/or destination n, as in block 730.

The recipient may download the multiple pieces such as, for example, piece 1, piece 2, piece 3, and/or piece n that are located at the multiple destination such as, for example, destination 1, destination 2, destination 3, and/or destination n, as in block 740. The multiple pieces such as, for example, piece 1, piece 2, piece 3, and/or piece n may be recombined, as in block 750. The recombined pieces may be viewed as a single image (e.g., image A) on the recipients device, as in block 760.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for providing intelligent distribution of data in a computing environment using one or more processor devices, comprising:

determining an appropriateness level of media data based on a plurality of factors for sending the media data from one or more computing devices;

selecting a first communication protocol for transmitting the media data according to the appropriateness level;

transmitting the media data using the first communication protocol from the one or more computing devices to one or more recipient computing devices within a defined proximity according to the appropriateness level;

determining the one or more recipient computing devices exceed a boundary range of the defined proximity;

selecting a second communication protocol for transmitting the media data according to the appropriateness level upon determining the one or more recipient computing devices exceed the boundary range of the defined proximity;

splitting the media data into a plurality of media data slices upon determining that the one or more recipient computing devices exceed the boundary range of the defined proximity; and sending the plurality of media data slices via the second communication protocol to a plurality of temporary destinations, wherein the one or more recipient computing devices accesses and retrieves one or more of the plurality of media data slices from each of the plurality of temporary destinations.

2. The method of claim 1, further including enabling the one or more recipient computing devices to combine each of the plurality of media data slices into the media data.

3. The method of claim 1, further including determining the appropriateness level for the media data is less than, equal to, or greater than a predetermined threshold.

4. The method of claim 3, further including:
transmitting the media data using the first communication protocol upon determining the appropriateness level for the media data is equal to or greater than the predetermined threshold and the one or more recipient computing devices are within the defined proximity; or transmitting the media data using a second communication protocol upon determining the appropriateness level for the media data is equal to or greater than the predetermined threshold and the one or more recipient computing devices are exceed a boundary range of the defined proximity.

5. The method of claim 1, further including initializing a machine learning mechanism to:
interpreting legal, ethical, moral, cultural, ethnicity, media data ratings or courteous ones of a plurality of contextual factors for determining the appropriateness level for the media data;

collect feedback data relating to the appropriateness level for media data; and training one or more machine learning models to learn, identify, and rank the appropriateness level for the media data.

6. A system for providing intelligent distribution of data in a computing environment, comprising:
one or more computers with executable instructions that when executed cause the system to:
determine an appropriateness level of media data based on a plurality of factors for sending the media data from one or more computing devices;

select a first communication protocol for transmitting the media data according to the appropriateness level;

transmit the media data using the first communication protocol from the one or more computing devices to one or more recipient computing devices within a defined proximity according to the appropriateness level;

determine the one or more recipient computing devices exceed a boundary range of the defined proximity;

select a second communication protocol for transmitting the media data according to the appropriateness level upon determining the one or more recipient computing devices exceed the boundary range of the defined proximity;

split the media data into a plurality of media data slices upon determining that the one or more recipient computing devices exceed the boundary range of the defined proximity; and send the plurality of media data slices via the second communication protocol to a plurality of temporary destinations, wherein the one or more recipient computing devices accesses and retrieves one or more of the plurality of media data slices from each of the plurality of temporary destinations.

7. The system of claim 6, wherein the executable instructions when executed cause the system to enable the one or more recipient computing devices to combine each of the plurality of media data slices into the media data.

8. The system of claim 6, wherein the executable instructions when executed cause the system to determine the appropriateness level for the media data is less than, equal to, or greater than a predetermined threshold.

9. The system of claim 8, wherein the executable instructions when executed cause the system to:
transmit the media data using the first communication protocol upon determining the appropriateness level for the media data is equal to or greater than the predetermined threshold and the one or more recipient computing devices are within the defined proximity; or transmit the media data using a second communication protocol upon determining the appropriateness level for the media data is equal to or greater than the predetermined threshold and the one or more recipient computing devices are exceed a boundary range of the defined proximity.

10. The system of claim 6, wherein the executable instructions when executed cause the system to initialize a machine learning mechanism to:
interpret legal, ethical, moral, cultural, ethnicity, media data ratings or courteous ones of a plurality of contextual factors for determining the appropriateness level for the media data;

collect feedback data relating to the appropriateness level for the media data; and train one or more machine learning models to learn, identify, and rank the appropriateness level for the media data.

11. A computer program product for providing intelligent distribution of data in a computing environment by a processor, the computer program product comprising a non-transitory computer-readable storage medium having computer-readable program code portions stored therein, the computer-readable program code portions comprising:
an executable portion that determines an appropriateness level of media data based on a plurality of factors for sending the media data from one or more computing devices;

an executable portion that selects a first communication protocol for transmitting the media data according to the appropriateness level;

an executable portion that transmits the media data using the first communication protocol from the one or more computing devices to one or more recipient computing devices within a defined proximity according to the appropriateness level;

an executable portion that determines the one or more recipient computing devices exceed a boundary range of the defined proximity;

an executable portion that selects a second communication protocol for transmitting the media data according to the appropriateness level upon determining the one or more recipient computing devices exceed the boundary range of the defined proximity;

an executable portion that splits the media data into a plurality of media data slices upon determining that the one or more recipient computing devices exceed the boundary range of the defined proximity; and an executable portion that sends the plurality of media data slices via the second communication protocol to a plurality of temporary destinations, wherein the one or more recipient computing devices accesses and retrieves one or more of the plurality of media data slices from each of the plurality of temporary destinations.

12. The computer program product of claim 11, further including an executable portion that enables the one or more recipient computing devices to combine each of the plurality of media data slices into the media data.

13. The computer program product of claim 11, further including an executable portion that:
   determines the appropriateness level for the media data is less than, equal to, or greater than a predetermined threshold;
   transmits the media data using the first communication protocol upon determining the appropriateness level for the media data is equal to or greater than the predetermined threshold and the one or more recipient computing devices are within the defined proximity; or
   transmits the media data using a second communication protocol upon determining the appropriateness level for the media data is equal to or greater than the predetermined threshold and the one or more recipient computing devices are exceed a boundary range of the defined proximity.

14. The computer program product of claim 11, further including an executable portion that initializes a machine learning mechanism to:
   interpret legal, ethical, moral, cultural, ethnicity, media data ratings or courteous ones of a plurality of contextual factors for determining the appropriateness level for the media data;
   collect feedback data relating to the appropriateness level for the media data; and train one or more machine learning models to learn, identify, and rank the appropriateness level for the media data.

* * * * *